(12) United States Patent
Bougie

(10) Patent No.: US 12,355,606 B2
(45) Date of Patent: Jul. 8, 2025

(54) PASSIVE RF EMITTER IDENTIFICATION SYSTEM AND METHODS

(71) Applicant: Anno.ai, Inc., Duluth, MN (US)

(72) Inventor: Jonathan Bougie, Hamilton, VA (US)

(73) Assignee: Anno.ai, Inc., Duluth, MN (US)

( * ) Notice: Subject to any disclaimer, the term of this patent is extended or adjusted under 35 U.S.C. 154(b) by 149 days.

(21) Appl. No.: 18/298,081

(22) Filed: Apr. 10, 2023

(65) Prior Publication Data

US 2023/0412445 A1    Dec. 21, 2023

Related U.S. Application Data

(60) Provisional application No. 63/329,098, filed on Apr. 8, 2022.

(51) Int. Cl.
*H04L 27/26* (2006.01)

(52) U.S. Cl.
CPC ...... *H04L 27/2649* (2013.01); *H04L 27/2602* (2013.01)

(58) Field of Classification Search
CPC .................................................. H04L 27/2649
See application file for complete search history.

(56) References Cited

U.S. PATENT DOCUMENTS

| | | | | |
|---|---|---|---|---|
| 6,333,690 | B1 * | 12/2001 | Nelson | G06Q 50/26 340/8.1 |
| 8,248,211 | B2 * | 8/2012 | Bares | G06K 19/0705 340/10.3 |
| 8,600,298 | B1 * | 12/2013 | Hyde | G06K 7/10029 455/41.1 |
| 9,509,442 | B2 * | 11/2016 | Callard | H03M 13/6525 |
| 2008/0129504 | A1 * | 6/2008 | Killian | G06K 19/0717 340/572.1 |
| 2008/0157925 | A1 * | 7/2008 | Batra | G06K 7/0008 340/10.1 |
| 2009/0177951 | A1 * | 7/2009 | Lee | H03M 13/3994 714/E11.002 |
| 2012/0116683 | A1 * | 5/2012 | Potyrailo | G01N 27/026 977/773 |
| 2013/0314226 | A1 * | 11/2013 | Zhang | F24C 7/082 340/539.11 |
| 2014/0215602 | A1 * | 7/2014 | Chuaprasort | H04L 67/306 726/20 |

(Continued)

*Primary Examiner* — Jaison Joseph
(74) *Attorney, Agent, or Firm* — Faegre Drinker Biddle & Reath LLP

(57) ABSTRACT

A blind RF emitter identifier includes the ability to receive an RF transmission from an RF emitter and assess various characteristics of the RF signal and/or RF emitter that produced the signal. The blind RF emitter identifier can operate upon well-defined RF transmissions produced by regulated devices, but can also operate upon unknown devices that may not adhere to any RF standard or definition. An RF signal received by the blind RF emitter identifier can be demodulated through approximate and/or iterative techniques to reveal a bit stream rich in content. In one embodiment, the RF emitter identifier can discard unneeded bit streams (e.g., related to synchronization, payload, etc) and retain a string of bits that identify the device. The blind RF emitter identifier can also retain the baud rate, modulation, and other characteristics for subsequent comparison with other transmissions.

16 Claims, 8 Drawing Sheets

(56) References Cited

U.S. PATENT DOCUMENTS

| | | | | |
|---|---|---|---|---|
| 2014/0327524 A1* | 11/2014 | Jones | ............... | G06K 7/10108 |
| | | | | 340/10.42 |
| 2015/0124906 A1* | 5/2015 | Gopalan | ............... | H04L 27/20 |
| | | | | 375/302 |
| 2017/0094527 A1* | 3/2017 | Shattil | ............... | H04K 3/92 |
| 2019/0103030 A1* | 4/2019 | Banga | ............... | G08G 5/0021 |
| 2020/0143218 A1* | 5/2020 | Lee | ............... | H04W 4/80 |
| 2020/0220736 A1* | 7/2020 | Subramanian | ............... | H04L 9/3252 |
| 2023/0412445 A1* | 12/2023 | Bougie | ............... | H04L 27/2649 |

\* cited by examiner

PASSIVE RF EMITTER IDENTIFICATION SYSTEM AND METHODS

PRIORITY CLAIM

This application claims to and the benefit of U.S. Provisional Patent Application No. 63/329,098, filed Apr. 8, 2022, which is incorporated herein by reference in its entirety.

TECHNICAL FIELD

The present disclosure generally relates to systems and methods useful to process RF signals, and more particularly, but not exclusively, to systems and methods useful to identify devices emitting an RF signal.

BACKGROUND

Providing the ability to detect a device emitting an RF signal remains an area of interest. Some existing systems have various shortcomings relative to certain applications. Accordingly, there remains a need for further contributions in this area of technology.

SUMMARY

One embodiment of the present disclosure is a unique system for identifying a device from an RF signal without a priori knowledge of the RF signal. Other embodiments include apparatuses, systems, devices, hardware, methods, and combinations for identifying characteristics of an RF signal. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
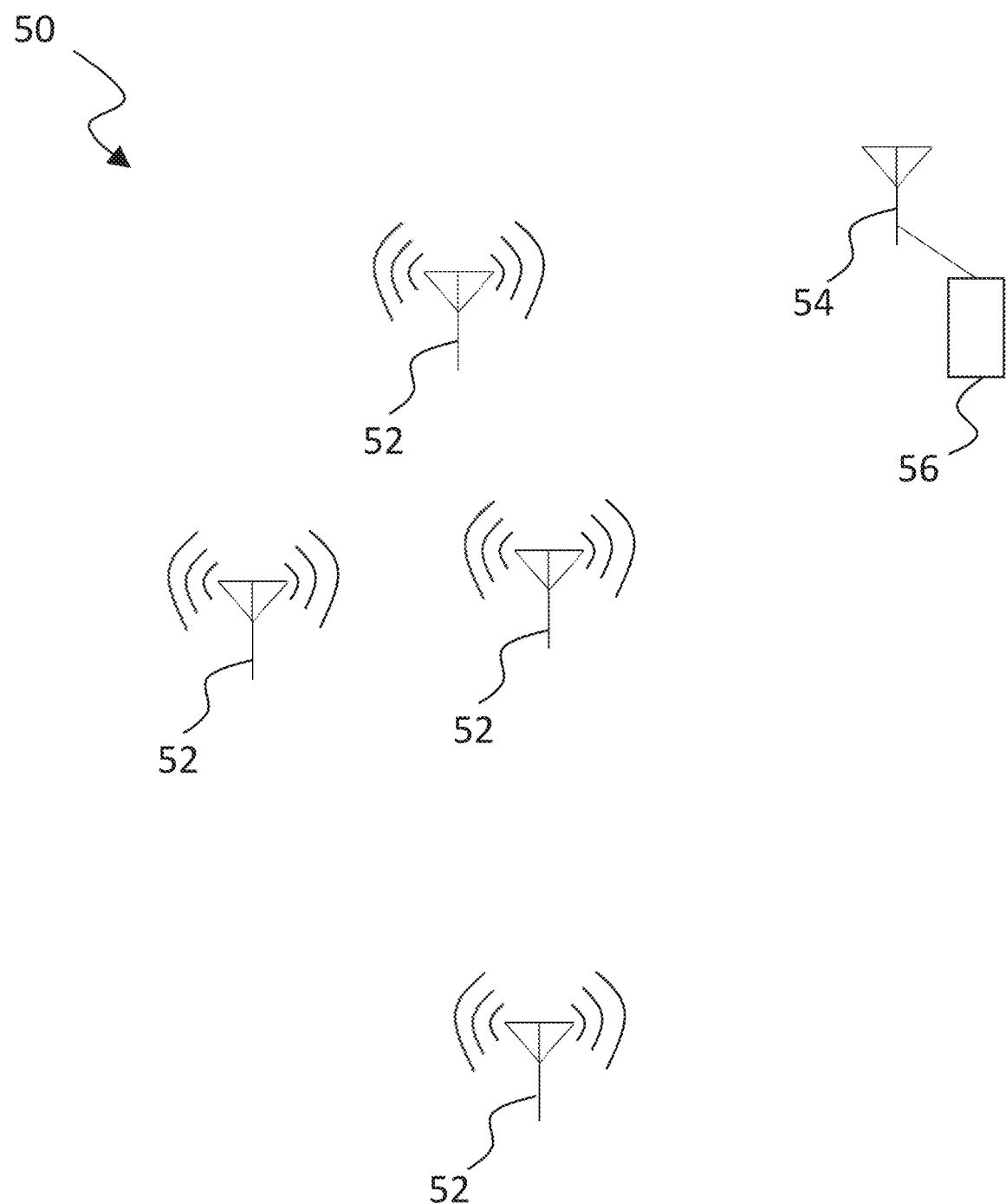
FIG. 1 depicts a scene of RF emitters and an RF receiver with blind RF processing system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A passive radio frequency (RF) emitter identification technique is disclosed herein that can be used to identify an emitter (e.g., an RF source) based on the RF transmission transmitted from the emitter. The RF emitter identification technique can be used on a variety of emitter types, both regulated and unregulated, using only the physical layer of the radio transmission and a demodulation of that physical layer to produce raw bits, in the form of a transmission bit string, for analysis. In some forms, the demodulation occurs at a first level only. The raw bits, or transmission bit string, can be compared against other bits, and specifically re-occurring sequences of bits. The re-occurring sequences of bits can be flagged, isolated, or otherwise identified to aid in the identification, or re-identification, of a particular device transmitting the data packets. Some or all of the reoccurring sequences of bits can be referred to as the RF identification bit string which is indicative of the identity of the RF source (e.g., an identity related to the category or type of device, or the identify of a particular device, to set forth just a few non-limiting examples). The non-reoccurring sequences of bits can be referred to as the non-identification bits. Either the transmission bit string associated with the RF transmission, or the RF identification bit string, or both, can be archived to a datastore (e.g., a database such as, but not limited to, a database hosted in a cloud computing environment). The datastore can include any variety of information related to the particular RF transmission, including the RF identification bit string, transmission bit string, time of RF transmission capture, place of RF transmission capture (e.g., noting the physical location of a receiver that received the RF transmission), among others.

Turning to FIG. 1, a scene 50 of various RF emitters/sources 52 are depicted which are capable of emitting digital data (e.g., an RF transmission) into the blind and/or to any RF receiver 54 configured to receive a transmission from the transmitter/source 52. The RF transmissions/emissions between 52 and 54 can be unidirectional in nature, but in some cases it is understood that the transmissions will be bi-directional as appropriate. Therefore, although reference may be made herein to an 'emitter' or a 'source' or a 'transmitter' or to a 'receiver,' it will be appreciated that any particular emitter/source/transmitter and/or receiver can in fact be a transceiver capable of both emitting/transmitting and receiving. As used herein, reference may be made alternatively to either an "emitter" or "RF source," or RF transmitter, all intended to alternatively refer to device 52. Furthermore, the emitter/transmitter and/or receiver can be implemented in traditional hardware electronics and/or with software techniques including software defined radios/antennas, etc. No limitation is hereby intended that reference to an 'emitter' or 'source' such as device 52 is only structured to emit/transmit, or that reference to a 'receiver' such as device 54 is only structured to receive. Nor is there any intention to limit the type of device used for those functions.

Any given RF transmission of data typically includes encoding data onto a carrier signal through modulation. Upon receipt by any suitable receiver (e.g., receiver 54), the RF transmission can thereafter be demodulated to reveal the data signal intended for transmission. Any number of different techniques can be used to modulate the carrier from which the data signal can be determined by being demodulated. Examples of the types of modulations available include, for example, techniques defined by a regulating governing body (e.g., FCC in the United States, Industry Canada, CE in Europe, etc) or non-regulated techniques. The electromagnetic spectrum is broken into several different frequency bands tied to specific uses and governed by specific rules. As will be appreciated, the passive RF emitter identification techniques disclosed herein are capable of use on both regulated and unregulated signals, as well as legal and nonlegal, transmissions. In short, the passive RF emitter identification technique can be operated without any specific knowledge of the type of transmission being evaluated.

No limitation is intended herein to limit the type of modulation through which the digital data is encoded, whether analog RF or digital RF. Non-limiting examples of two popular types of modulation include amplitude shift keying (ASK) and frequency shift keying (FSK). Furthermore, in a digital transmission setting the spectrum can be shared among a number of users in a given area of reception which necessitates several different techniques of modulation including frequency division multiple access (FDMA), time division multiple access (TDMA), and code division multiple access (CDMA). Unique and non-standard RF transmissions are also contemplated herein as being capable of passive RF emitter identification. Although there are numerous variations within just these aforementioned types of modulations (e.g., 'on-off keying' in ASK), no limitation is intended with respect to the type of modulation whether or not explicitly mentioned above. In short, it will be appreciated that digital data can be encoded and transmitted by RF using any variety of techniques whether regulated, unregulated, legal, illegal, popular, seldom used, bespoke, etc.

It will be appreciated that any variety of RF devices (e.g., devices 52 and 54) are contemplated for use with the disclosure herein. Nonlimiting examples of RF devices include Wi-Fi, cellular devices (e.g., cell phones), Bluetooth, LoRa, etc. In short, any device capable of emitting RF signals can be received by and operated upon by the passive identification devices disclosed herein.

In some settings, radio frequency (RF) communication networks operate at the physical and data link layer of the Open Systems Interconnection (OSI) model. Conventional receipt and processing of RF emissions take into account both physical and data link layer characteristics at the receiver to properly receive/synchronize, demodulate, remove encoding, and verify data integrity. In other words, knowledge of the transmitter, etc. aids in efficiently extracting the data from the RF transmission. In full conventional processing, the entire message payload or intent can be derived for communications, acknowledgement, retransmission or relay. The data payload is typically encoded or encrypted, but synchronization bits or device identifiers (e.g., the message header) are often unencoded or unencrypted for ease of the intended recipient system to prevent unnecessary message processing (intended for other recipients).

The process described within this application is focused on a passive RF emitter identification through blind RF processing means, wherein a so-called 'blind' receiver does not have a priori knowledge of either physical or data link layers of the RF emitting devices. Once the RF transmission is received, a 'blind' processing device (e.g., device 56 illustrated in FIG. 2) can be used where the device 56 is constructed such that it does not discriminate on data received, instead handling all transmissions equally at a raw bit level. In short, the blind processing device 56 is capable of identifying the transmission bit string in an RF transmission and comparing all, or a portion of, the transmission bit string to previous transmissions to identify the emitter (e.g., to identify the type of emitter/source or the particular identity associated with the emitter/source). Whether the blind processing device 56 is physically connected to the receiver 54 or is geographically remote but otherwise in data communication with the receiver 54 (e.g., through networked communication, cloud computing, etc), the blind processing device 56 can be embodied in a computing device as will be appreciated by those skilled in the art. In some forms, the blind processing device 56 can also be in communication with other blind processing devices 56 and/or a datastore configured to host data and/or processed identities of RF transmissions.

Figure 2:
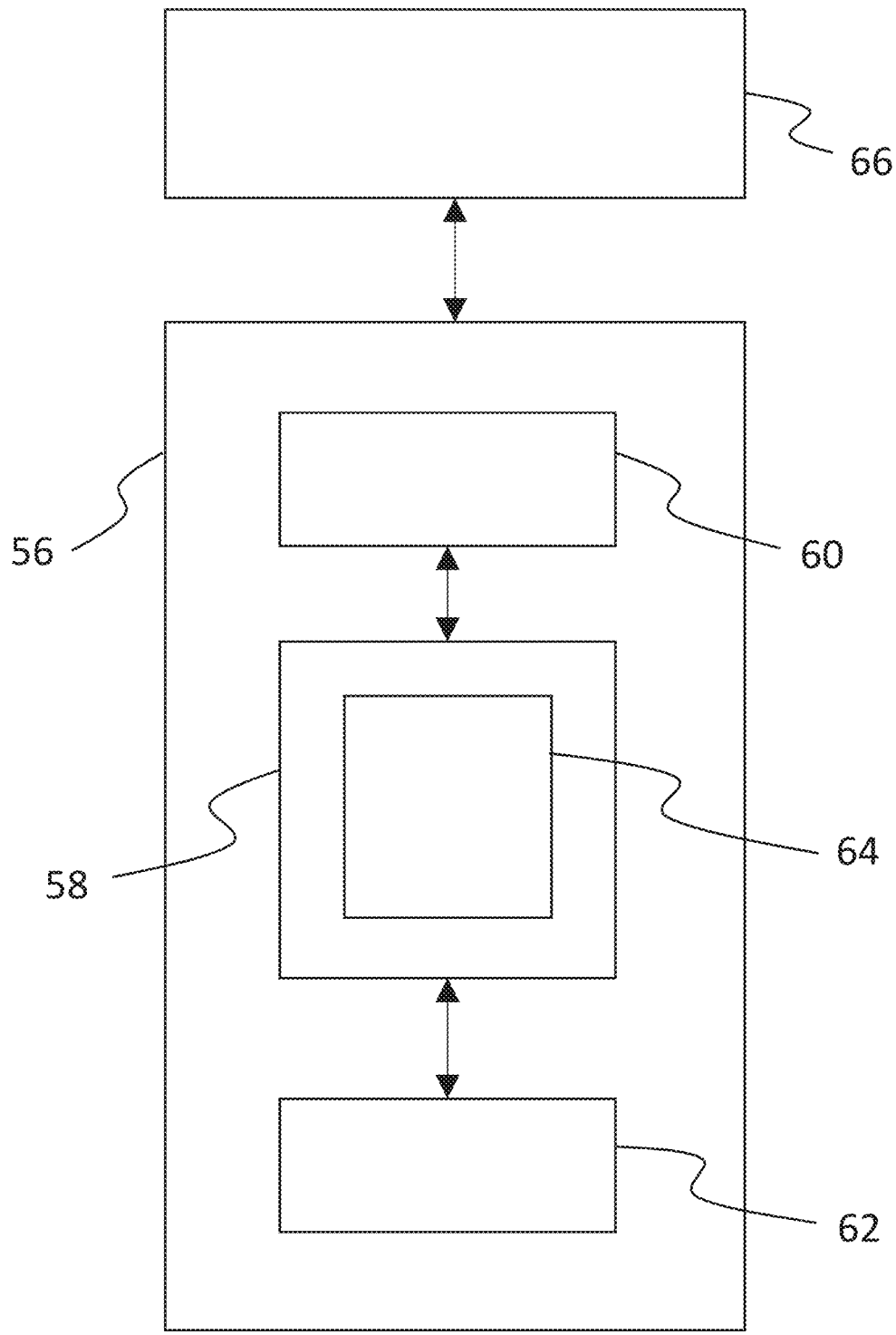
FIG. 2 depicts an embodiment of a blind RF processing system.

Turning now to FIG. 2, one embodiment of the blind processing device 56 in the form of a computing device is illustrated which is useful to determine an emitter identity using data transmitted and received such as in an environment depicted in FIG. 1. The computing device, or computer, 56 can include a processing device 58, an input/output device 60, memory 62, and operating logic 64. Furthermore, computing device 56 can be configured to communicate with one or more external devices 66 (e.g., another computer device 56 or display capable of displaying information). In some forms, the computing device can include one or more servers such as might be available through cloud computing, or can communicate with one or more services such as might be available through cloud computing.

The input/output device 60 may be any type of device that allows the computing device 56 to communicate with the external device 66. For example, the input/output device may be a network adapter, network card, or a port (e.g., a USB port, serial port, parallel port, VGA, DVI, HDMI, FireWire, CAT 5, or any other type of port). The input/output device 60 may be comprised of hardware, software, and/or firmware. It is contemplated that the input/output device 60 includes more than one of these adapters, cards, or ports.

The external device 66 may be any type of device that allows data to be inputted or outputted from the computing device 56. To set forth just a few non-limiting examples, the external device 66 may be another computing device, a printer, a display, an alarm, an illuminated indicator, a keyboard, a mouse, mouse button, or a touch screen display. In some forms, there may be more than one external device in communication with the computing device 56, such as, for example, another computing device structured to transmit to and/or receive content from the computing device 50. Furthermore, it is contemplated that the external device 66 may be integrated into the computing device 56. In such forms, the computing device 56 can include different configurations of computers 56 used within it, including one or more computers 56 that communicate with one or more external devices 62, while one or more other computers 56 are integrated with the external device 66.

Processing device 58 can be of a programmable type, a dedicated, hardwired state machine, or a combination of these; and can further include multiple processors, Arithmetic-Logic Units (ALUs), Central Processing Units (CPUs), Graphics Processing Units (GPU), or the like. For forms of processing device 58 with multiple processing units, distributed, pipelined, and/or parallel processing can be utilized as appropriate. Processing device 58 may be dedicated to performance of just the operations described herein or may be utilized in one or more additional applications. In the depicted form, processing device 58 is of a programmable variety that executes algorithms and processes data in accordance with operating logic 64 as defined by programming instructions (such as software or firmware) stored in memory 62. Alternatively or additionally, operating logic 64 for processing device 58 is at least partially defined by hardwired logic or other hardware. Processing device 58 can be comprised of one or more components of any type suitable to process the signals received from input/output device 60 or elsewhere, and provide desired output signals. Such components may include digital circuitry, analog circuitry, or a combination of both.

Memory 62 may be of one or more types, such as a solid-state variety, electromagnetic variety, optical variety, or a combination of these forms. Furthermore, memory 62 can be volatile, nonvolatile, or a mixture of these types, and some or all of memory 62 can be of a portable variety, such as a disk, tape, memory stick, cartridge, or the like. In addition, memory 62 can store data that is manipulated by the operating logic 64 of processing device 58, such as data representative of signals received from and/or sent to input/output device 60 in addition to or in lieu of storing programming instructions defining operating logic 64, just to name one example.

Figure 3:
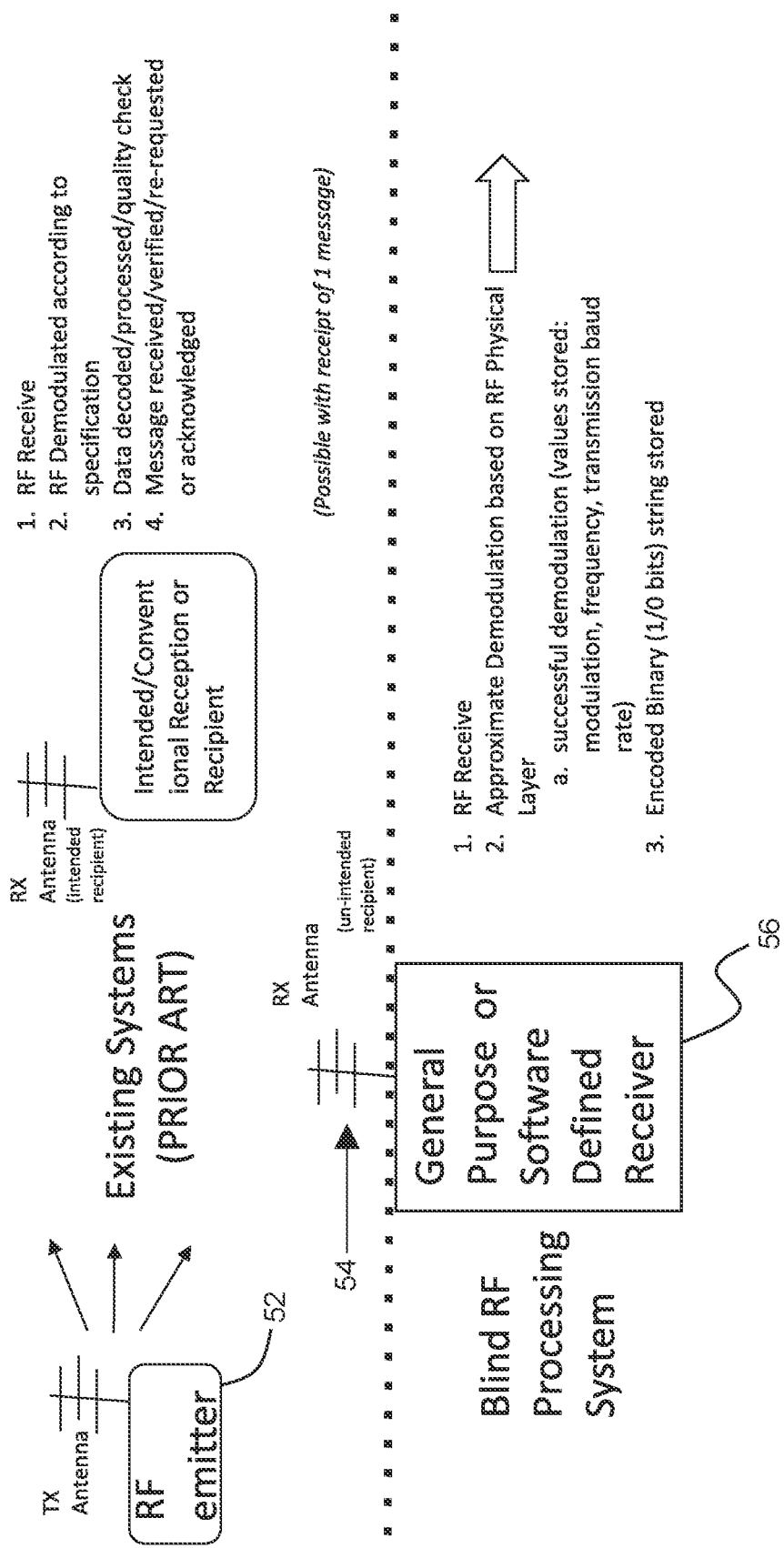
FIG. 3 depicts an existing RF receiver system and a blind RF processing system.

FIG. 3 illustrates the concept between existing (prior art) system and those of the passive RF emitter identifier disclosed herein in the form of the blind processing device 56. Existing systems illustrated in FIG. 3 receive the RF signal from the emitter 52 and process the signal, where such processing can include: demodulating according to a known specification; decoding, processing and quality checking the result; and in some instances replying back from the receiver 52 any of one of an acknowledgement that the message was received, a transmission that the message was verified, or re-requesting the original transmission. The blind RF processing system 56, on the other hand, is capable of receiving the RF signal emitted from emitter 52, approximating/estimating the demodulation, and storing the encoded binary (e.g., the transmission bit string). As used herein, the term 'store,' 'storing,' or 'stored' as it relates to information determined as a result of receiving the RF transmission and determining the RF identification bit string (as well as any other related information discussed herein) can refer to the process or archiving the data in a datastore. After the first transmission of data received by the blind RF processing system 56, subsequent transmissions can be compared against it to flag a reoccurrence of the emitter 52. For example, in some networking environments where multiple frames or data packets are transmitted, successive transmissions, such as those separated by an interframe gap can be compared with each other to identify the reoccurrence of bits. In another example, in situations in which an emitter 52 transmits an RF signal at a first instance of time but then does not reappear to transmit again until a second instance of time (hours, days, or months later, for example), the system 56 can compare the subsequent RF signal transmission and, if the identifiers match, record a reoccurrence of the emitter 52. Thus, the blind processing device 56 is constructed to compare to prior received transmission bit strings for emitter identification purposes only and is not intended for data payload use. Although the bits related to the payload may be inspected, it is for purposes of identification of the emitter, and not for purposes of inspecting the payload. As will be described further herein, payload bits will not typically align with a string of bits associated with an emitter identification, and for that reason the payload bits are inspected but quickly discarded. Additionally, since the device fingerprint would be unique to this system/process, the passive RF emitter identification system described herein has more privacy inherent to system defined identifications since the identifications of the transmitting source 52 would be unique to the system/process described herein, and not necessarily including the true-ID of the transmitting device.

The blind RF processing device 56 can be used in regulated RF transmission bands (where the types of modulations and data types are similar and limited), and it can excel in unregulated RF transmission environments where a high diversity of signal device types/transmitter types, and unique transmitter emitters are found. In the later environments all observed waveforms may not be strictly following published or required specifications so a great diversity of processing methodologies are required. Regardless of environment, and without the blind processor having specific receiver requirements (as seen in conventional systems, for example illustrated in FIG. 3), the blind processor can isolate device types and specific emitters without prior knowledge of the content of the RF transmissions being specifically identified.

It will be appreciated that emitter identification can be preserved in its original form (e.g., the RF identification bit string), or the emitter identification can be hashed or otherwise obscured to hide the identity of the device. For example, the RF identification bit string can be hashed. For singleton systems such as those of a solitary installation of receiver 56 whose purposes may be device or vehicle/equipment density estimations (such as number of mobile phones in an area, or vehicles in an intersection) but otherwise not having the need to particularly identify a device, the unique emitter identification can be hashed/obscured and not able to compare to other systems. Hashing of the RF identification bit string permits the determination of the number of unique devices over a given period of time, such as might be useful for determining occupancy statistics. For a multiple system installation, the data can be compared between systems for use cases such as travel time assessments, surveillance, surveillance detection or general tracking for logistics purposes.

It will be appreciated that the blind RF processor 56 can be located in the same vicinity of unknown RF transmitting equipment. Due to the normal RF propagation, the receipt of the signal from the emitter 52 to the receiver 54 has no impact on the intended recipient reception of the complete message.

Figure 4:
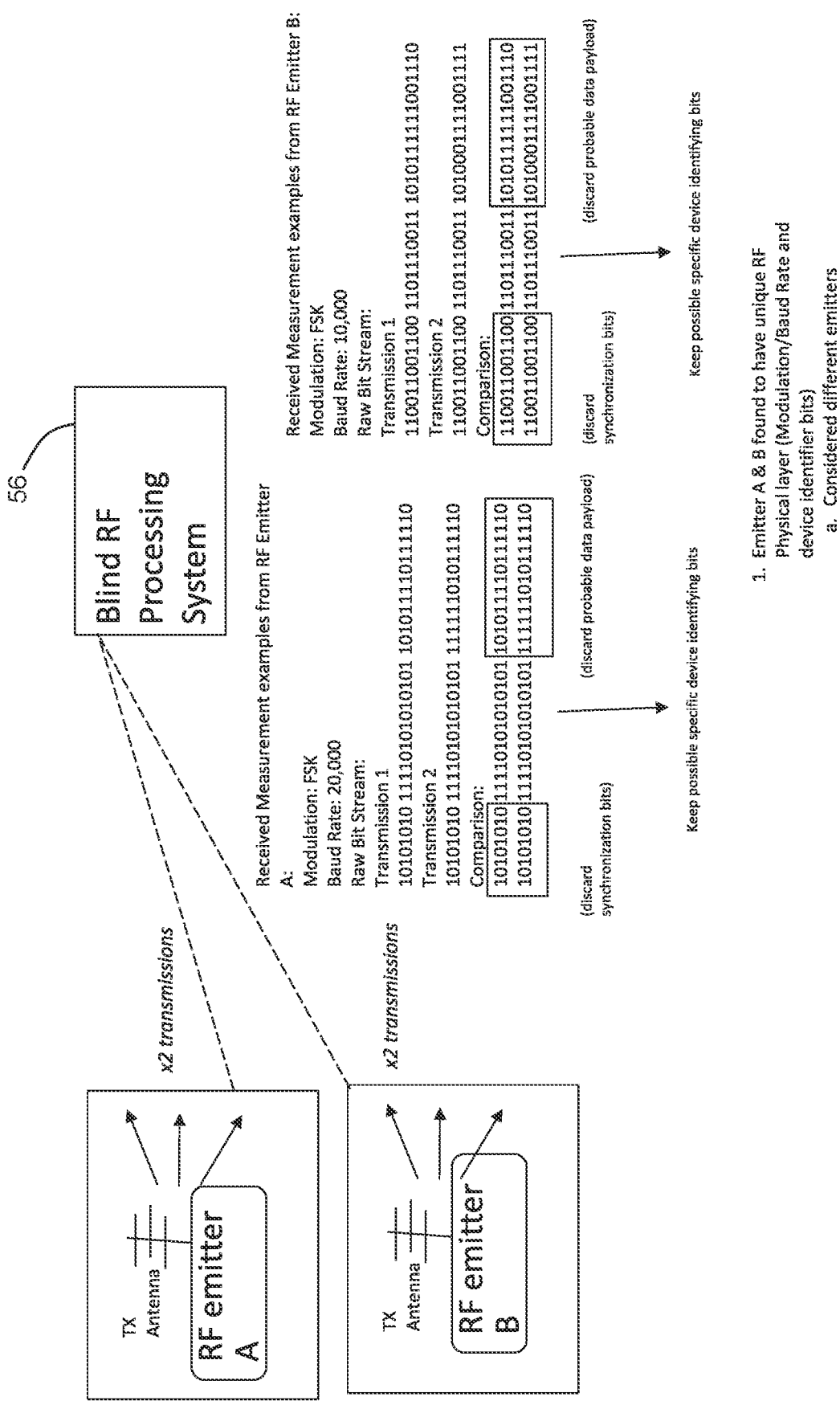
FIG. 4 depicts an embodiment of the blind RF processing system.

FIG. 4 illustrates additional details of the blind RF processor 56. The blind RF processor uses approximate and iterative physical layer processing on the RF transmission, in which the processing can use multiple modulation and baud rates aiming for demodulation at the bit level only. In one form, the processing can optimally iterate to determine a best fit demodulation so that individual bits are detected. Demodulating the signal from the carrier can be accomplished using a variety of approaches including through the use of software defined radio or traditional radio using either synchronous or asynchronous signal processing approaches. As will be appreciated, any of these approaches can be implemented in the computer device 56. Consideration may not be given in some embodiments to require any specific decoding or bit checking on the demodulated data. The binary transmission bit string that results from this initial processing might, in some instances, be larger than that of optimized systems (e.g., conventional/existing systems that are 'optimized' in which transmitter and receiver are cooperatively configured in advance with respect to expectations of the transmission). Once the RF transmission is demodulated, various characteristics besides the transmission bit string can also be determined. For example, based on the approximate and iterative demodulation, the most successful modulation and baud rate values (e.g., the demodulation that produces a transmission bit string having identifiable bits) can be stored in the datastore along with the resultant transmission bit stream and, in some instances, the RF identification bit string. Either or both of the transmission bit stream and RF identification bit stream can be stored in the datastore in either or both of the resultant binary form, as well as the inverse binary form (1's converted to 0's, 0's converted to 1's) to take into account possible polarity changes during transmission or different sideband used by the RF emitter vs the Blind RF receiver.

As illustrated in FIG. 4, any of the information discussed above (e.g., the transmission bit string, modulation, baud rate, RF identification bit stream) can be stored in the device 56 or stored apart from the device 56. Examples of remote data storage include through the use of cloud storage, but other arrangements are also contemplated herein. Furthermore, any of the information discussed above (e.g., the transmission bit string, modulation, baud rate, RF identification bit stream) from receipt and processing of an unknown transmitter can be compared to subsequent and similar stored information (e.g., the transmission bit string, modulation, baud rate, RF identification bit stream). Any obvious synchronization/repetitive bits can be discarded as well as any un-matched portions of the bit streams which may be indicative of the data payload/encoded data. As illustrated in FIG. 4, the un-matched portions of the bit streams have differences between successive transmissions which can be indicative of a payload. The remaining raw bit stream after discard of unwanted bits (e.g., either/or the sync bits and the payload) would then be considered part of the emitter identification, the RD identification bit string, when taken into consideration with the physical layer (modulation/data rate). In other words, the identity of the RF source can be characterized by the set of RF identification bit string, modulation, and baud rate. Any one, or all, of this set of information can be used to set the identity of the RF source.

In some situations, it may not be straightforwardly apparent which portions may be discarded, in which case a longer string of bits can be retained and a later comparison made with a subsequent transmission. In some forms, the entire transmission bit string may be retained, while in others differences which appear over a length of bits, such as the payload, can be discarded and an intermediate RF identification bit string may be saved. Any number of comparative analysis techniques can be used to determine which bits to discard, the non-identification bits, and which bits to keep (either the RF identification bit string or the intermediate RF identification bit string). For example, a sliding window can be used to compare a first transmission bit string from a first transmission with a second transmission bit string from a second transmission (e.g., any transmission separated by time, such as by an interframe gap, interpacket gap, interframe spacing, or any other time separation be it measured in fractions of a second, several seconds, or longer). For example, a window size of, say, eight bits, can be used to compare between the first transmission bit string and the second transmission bit string. Where the sliding window finds a string of similar bits between the two transmissions the blind RF processor 56 can initiate a number of actions, including stripping away unneeded bits that fall outside the similarity window. If the sliding window identifies a string of similar bits longer than the bit length of the sliding window, all similar bits can nevertheless be identified as being similar. The similarity window used for comparison can be fixed in length or may be variable. Other techniques may also be used, such as global alignment when two sequences are compared and a similarity score determined over the length of the bit sequence prior to discarding unneeded non-identification bits (e.g., sync, payload, etc.). Other techniques also include a local-alignment when two sequences are compared, an optimal similarity score developed, and unneeded non-identification bits discarded. In still other embodiments, machine learning could also be used.

When taking into account a number of specific device identifications, the physical layer modulation, baud rate and location of the identifying bits can also be used to classify and separate types of devices. With respect to the location of identifying bits, the system 56 described herein can also record the bit location of the RF identification bit string and/or the interim RF identification bit string. In some embodiments, the location of identifying bits can also be stored in the datastore along with all other useful information used to identify the device (e.g., the modulation, baud rate, RF identification bit string, interim RF identification bit string, original transmission bit string). The ability to identify the location of the identifying bits permits the identity of the type of device used as the RF source. These separate device types are typically resultant of the respective systems radio frequency transmitting equipment or configurations. For example a wireless/IOT traffic signal control RF transmitter and a person's smart watch fitness device would be composed of different on-board radios and overall message content payloads. Different device types and different unique emitters. But two people with the same smart watch device would have the same RF physical waveform characteristics (e.g., modulation and/or baud rate), differing only in raw message payloads. The ability to identify all information (e.g., the modulation, baud rate, RF identification bit string, interim RF identification bit string, bit location of either/or of the RF identification bit string and interim RF identification bit string, and original transmission bit string) could be used to not only identify a particular device transmitting but also similar device types. Data entries related to each RF transmission and/or each RF identification bit string may also include stored data related to device type. Such stored data of device type can include the bit locations of the RF identification bit string and/or interim RF identification bit string, or an arbitrary identifier indicative of a device type.

While the blind emitter identification technique described herein can operate independently without any external inputs, it does not preclude the system from receiving external data inputs to increase processing speed, or classification approach. For example, the system could take into account the frequencies band/range and/or installation environment to narrow down possible external RF physical layer modulations and baud rates. Such use of the frequencies band/range can be used in demodulating an RF transmission which may, in some instances, intentionally exclude all possible varieties of RF transmissions. In some embodiments, a library of modulations and baud rates (including one or more entries in the library) can be used to apply against each RF transmission to identify an appropriate modulation and baud rate. Such use of a library can also permit storing, into the datastore discussed above, the particular information used from the library to demodulate the RF transmission. In the event other electromagnetic sensing systems were co-located (or sensing the same area, but not co-located) such as those in the visual spectrum (e.g., video cameras) the time coincidence of a vehicle or person could influence the sub-set of possible external RF physical layer modulations and baud rates from the time/location coincident devices. The sub-set of possible processing methods could additionally provide a full match of blind emitter identification characteristics down to the specific bits (for tracking/transit times) or simply the RF physical level and only location within the waveform of where to expect the identifying bits for isolated device density estimates.

Figure 5:
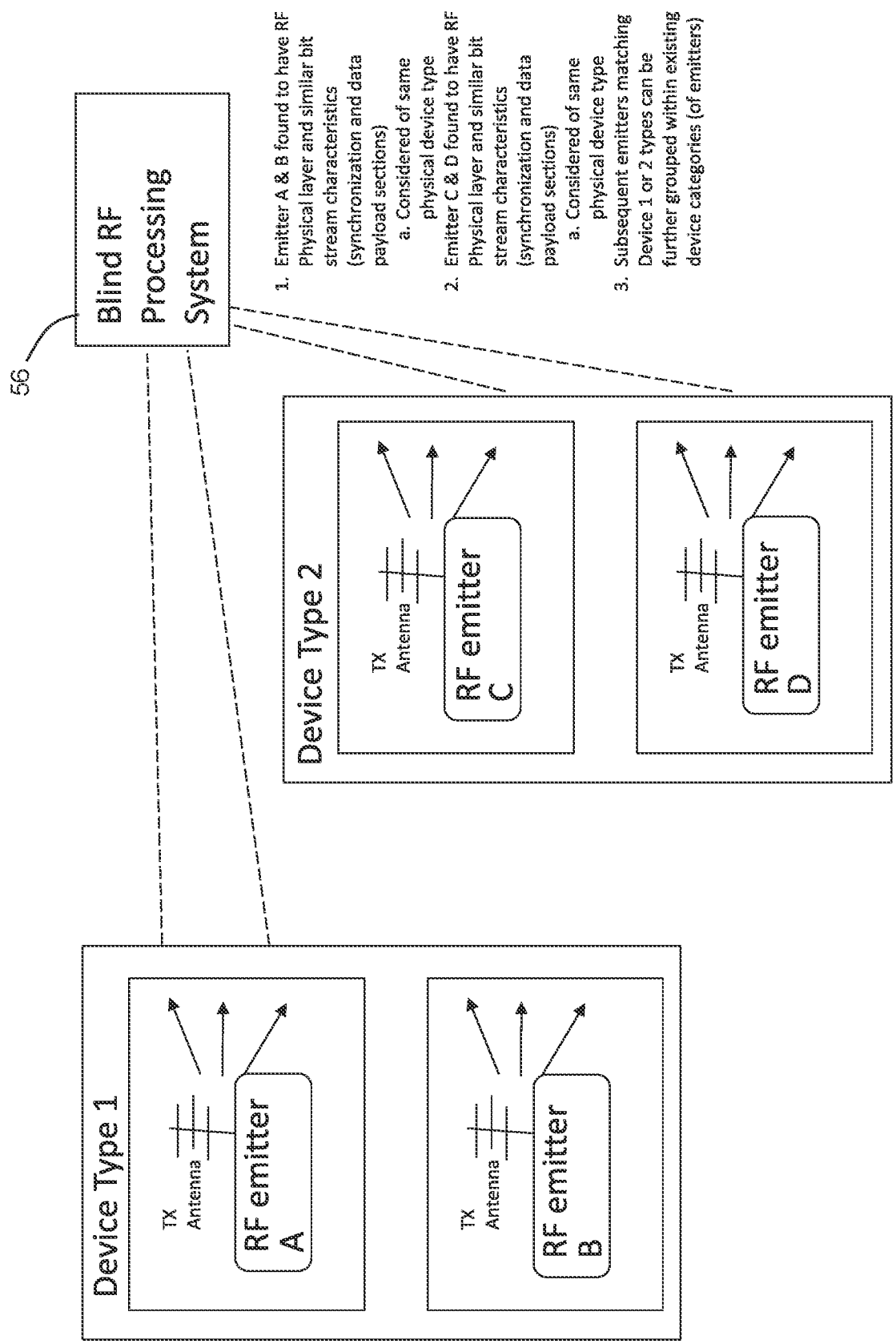
FIG. 5 depicts an embodiment of the blind RF processing system used to identify multiple devices and device types.

Turning now to FIG. 5, an example of the blind RF processing system 56 is illustrated in which it encounters multiple different devices that are also of different types. The RF processing system 56 is capable of identifying the physical layers of each of the devices and can detect similar bit stream characteristics using the techniques described above where carrier frequency and similarity of transmissions (e.g., length, bit location of RF identification string or interim RF identification string, global similarity, etc.) are determined. A plurality of devices, using the similarity of transmissions discussed above (e.g., length, bit location of RF identification string or interim RF identification string, global similarity, etc.), can be categorized into a Device Type 1 category, and other plurality of devices using the similarity of transmissions discussed above, can be categorized as Device Type 2. Other device types may also be identified through the course of use of the system 565. When the blind RF processing system 56 encounters subsequent transmissions of similar nature to either Device Type 1 or Device Type 2 it can categorize the subsequent transmissions as being from a similar device to that device type. Such use of the system 56, therefore, permits identification of device type, if not also unique identification of the device within the device type.

Figure 6:
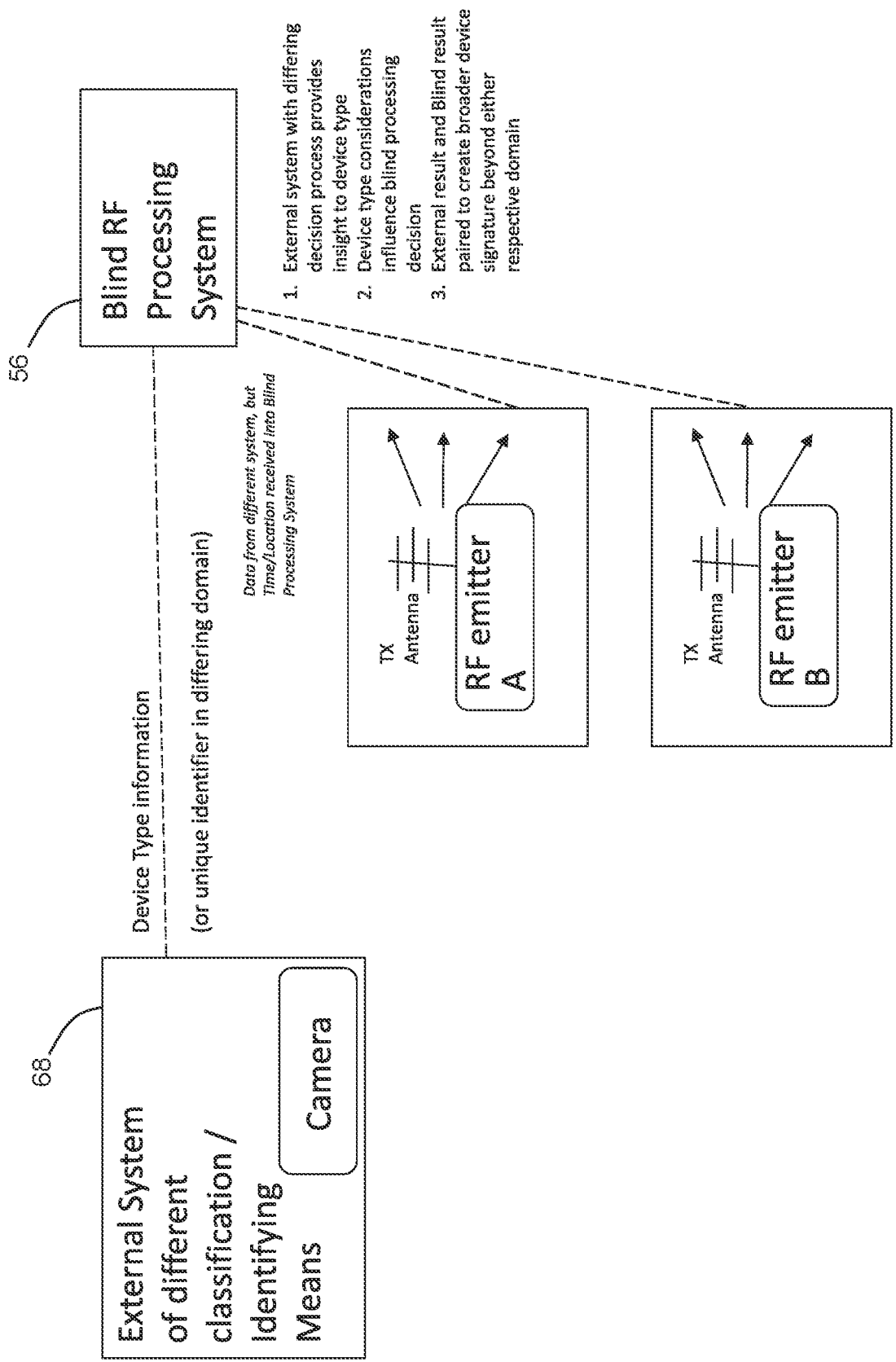
FIG. 6 depicts an embodiment of the blind RF processing system used in conjunction with an external device.

FIG. 6 illustrates an example of the system 56 used in conjunction with an external system 68 capable of providing information such as the device type to the system 56. The device type provided by the external system 68 can include any useful information, whether it be an alphanumeric identifier or particular information such as the physical layer modulation, baud rate, etc. The external system 68 may be a library, database, regulatory authority definitions, or other type of information system capable of ingesting RF transmissions and classifying the type of RF device based upon its own processing/decision process. The RF transmission can be provided to the external system 68 by the system 56 (e.g., through wired or wireless transmission, or through shared memory, or a data bus for processing with an external system 68 integrated into a common housing with system 56), or the external system 68 can have a receiver used to evaluate the RF transmission simultaneous with the system 56. Such use of external system 68 may be informational only, such as providing detail (e.g., modulation and baud rate) for the blind RF processing system 56 to operate upon and make a determination of the type of RF device generating the signal transmission and/or any other useful information such as the RF identification bit string.

Figure 7:
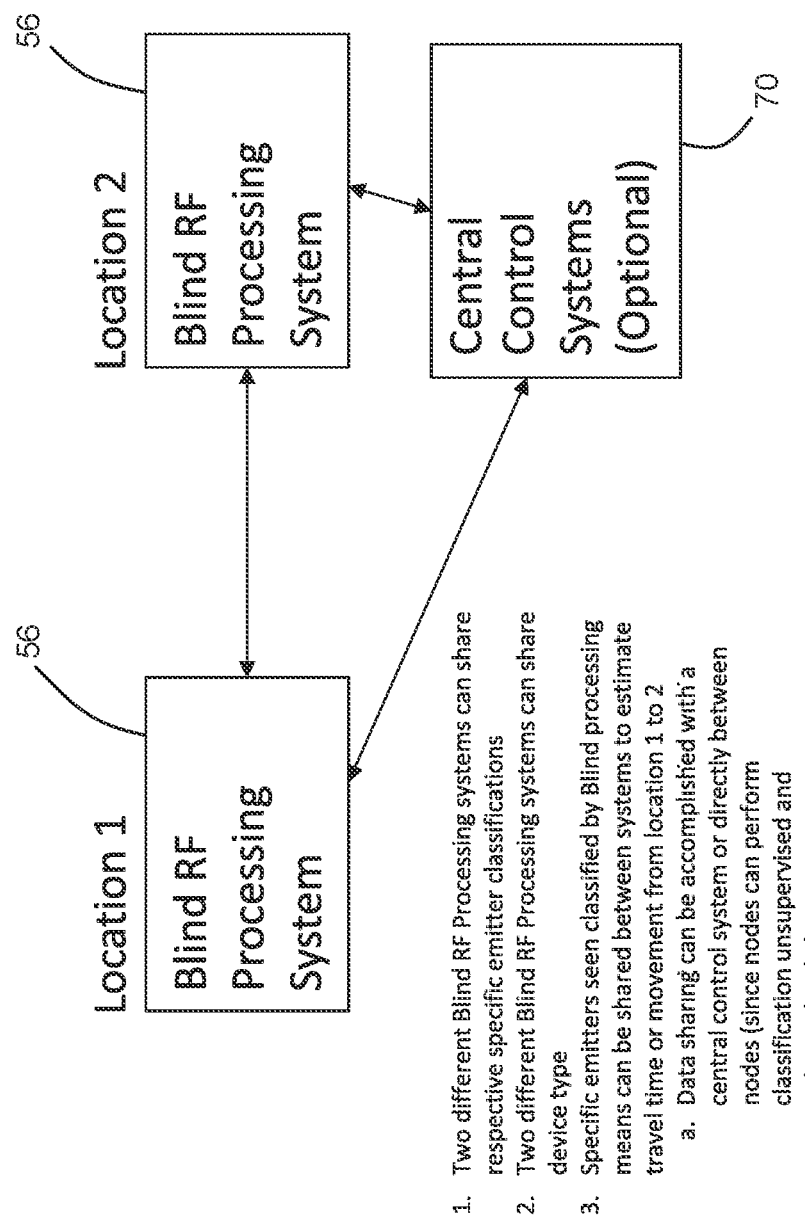
FIG. 7 depicts multiple blind RF processing systems working in conjunction with each other.

FIG. 7 illustrates the operation of two separate blind RF processing systems 56 which cooperate with each other to provide yet further information of an RF transmitter 52. Each of the blind systems 56 can receive transmissions from an RF device 52 and share respective analysis with each other and/or a central control system 70. The systems 56 can share not only the emitter classification of a transmitter 52, but also a device type using the techniques described above to determine both. In the illustration of FIG. 7, yet further information can be determined about the emitter 52 by temporal comparison. For example, two systems 56 spaced apart geographically can be used to determine a travel time or movement between the separate locations of the RF source 52 using the RF identification bit string. The central control system 70 can be the datastore discussed hereinabove, or any other system having capabilities similar to the system 56. Queries can be made to the datastore to determine a location and a time associated with the RF transmission that produced the RF identification bit string. Queries can also be made to determine the number of devices having a specific device type that have been received by the system 56, and/or received within a certain time period.

Figure 8:
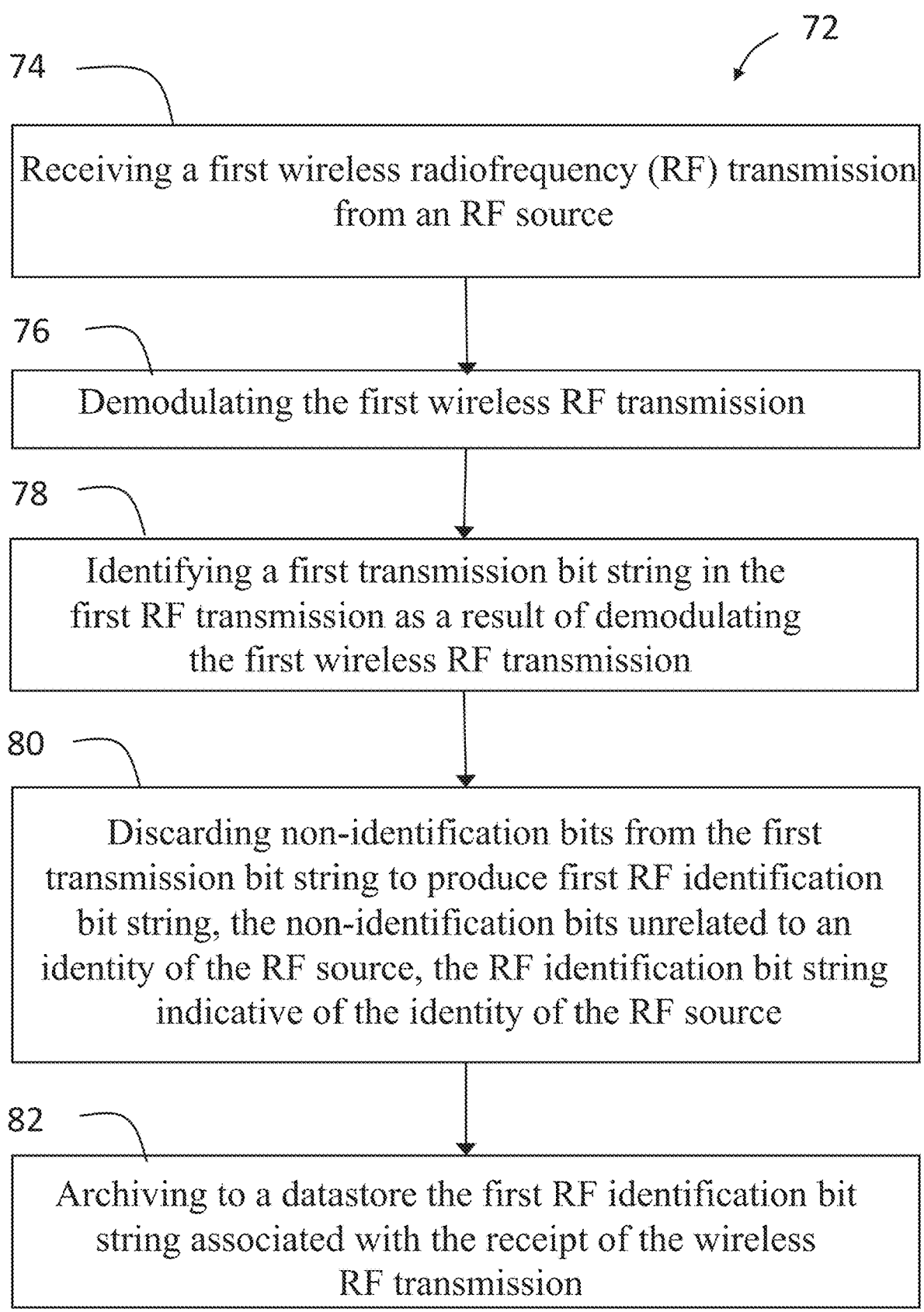
FIG. 8 depicts a method for identifying a source of a wireless transmission.

Turning now to FIG. 8, an embodiment of a method 72 is disclosed for identifying a source of a wireless transmission. The method 72 includes, at step 74, receiving a first wireless radiofrequency (RF) transmission from an RF source 52. Step 76 includes demodulating the first wireless RF transmission. At step 78, the method 72 includes identifying a first transmission bit string in the first RF transmission as a result of demodulating the first wireless RF transmission. Step 80 includes discarding non-identification bits from the first transmission bit string to produce first RF identification bit string, the non-identification bits unrelated to an identity of the RF source, the RF identification bit string indicative of the identity of the RF source. At step 82, the method 72 includes archiving to a datastore the first RF identification bit string associated with the receipt of the wireless RF transmission.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. A non-transitory computer-readable medium storing one or more instructions that, when executed by one or more processors, are configured to cause the one or more processors to perform operations comprising:
receiving a first wireless radiofrequency (RF) transmission from an RF source;
demodulating the first wireless RF transmission;
identifying a first transmission bit string in the first RF transmission as a result of demodulating the first wireless RF transmission;
discarding non-identification bits from the first transmission bit string to produce first RF identification bit string, the non-identification bits unrelated to an identity of the RF source, the RF identification bit string indicative of the identity of the RF source;
archiving to a datastore the first RF identification bit string associated with the first wireless RF transmission;
receiving a second wireless RF transmission from the RF source;
demodulating the second wireless RF transmission; and identifying a second transmission bit string in the second RF transmission as a result of demodulating the second wireless RF transmission;

wherein the discarding the non-identification bits includes comparing the first transmission bit string to the second transmission bit string.

2. The non-transitory computer-readable medium of claim 1, wherein the discarding is based on the comparing the first transmission bit string to the second transmission bit string, the comparing resulting in an identification of the non-identification bit strings.

3. The non-transitory computer-readable medium of claim 2, wherein discarding the non-identification bits includes discarding at least one of synchronization bits and payload bit string.

4. The non-transitory computer-readable medium of claim 1, which further includes comparing the first RF identification bit string with a plurality of stored RF identification bit strings in the datastore.

5. The non-transitory computer-readable medium of claim 4, as a result of the comparing, matching the first RF identification bit string with one of the stored RF identification bit strings.

6. The non-transitory computer-readable medium of claim 4, archiving to the datastore at least one of a time stamp and a location associated with receiving the first RF transmission, and associating the time stamp with an entry in the datastore related to the one of the stored RF identification bit strings.

7. The non-transitory computer-readable medium of claim 1, as a result of demodulating, archiving to the datastore a modulation associated with first RF transmission, and frequency associated with the first RF transmission.

8. The non-transitory computer-readable medium of claim 1, wherein demodulating the wireless RF transmission is based on an RF physical layer associated with the wireless RF transmission.

9. A method for identifying a source of a wireless transmission, the method comprising:

receiving a first wireless radiofrequency (RF) transmission from an RF source;

demodulating the first wireless RF transmission;

identifying a first transmission bit string in the first RF transmission as a result of demodulating the first wireless RF transmission;

discarding non-identification bits from the first transmission bit string to produce first RF identification bit string, the non-identification bits unrelated to an identity of the RF source, the RF identification bit string indicative of the identity of the RF source; and archiving to a datastore the first RF identification bit string associated with the first wireless RF transmission;

receiving a second wireless RF transmission from the RF source;

demodulating the second wireless RF transmission; and identifying a second transmission bit string in the second RF transmission as a result of demodulating the second wireless RF transmission;

wherein the discarding the non-identification bits includes comparing the first transmission bit string to the second transmission bit string.

10. The method of claim 9, querying the datastore with a query condition to determine a location and a time associated with the RF identification bit string.

11. The method of claim 9, generating a notification when at least one of a location and a time associated with the RF identification bit string match a query condition.

12. The method of claim 9, which further includes comparing the first RF identification bit string with a plurality of stored RF identification bit strings in the datastore.

13. The method of claim 12, as a result of the comparing, matching the first RF identification bit string with one of the stored RF identification bit strings.

14. The method of claim 12, archiving to the datastore at least one of a time stamp and a location associated with receiving the first RF transmission, and associating the time stamp with an entry in the datastore related to the one of the stored RF identification bit strings.

15. The method of claim 9, wherein the discarding is based on the comparing the first transmission bit string to the second transmission bit string, the comparing resulting in an identification of the non-identification bit strings.

16. The method of claim 15, wherein discarding the non-identification bits includes discarding at least one of synchronization bits and payload bit string.

* * * * *